May 15, 1923.

J. C. MANOCK

SECURING MEANS FOR SPARE TIRES

Filed May 31, 1922

1,455,119

INVENTOR
JULIUS C. MANOCK
BY
Bradley L. Benson
ATTORNEY

Patented May 15, 1923.

1,455,119

UNITED STATES PATENT OFFICE.

JULIUS C. MANOCK, OF ANGIOLA, CALIFORNIA.

SECURING MEANS FOR SPARE TIRES.

Application filed May 31, 1922. Serial No. 564,816.

*To all whom it may concern:*

Be it known that I, JULIUS C. MANOCK, a citizen of the United States of America, residing at Angiola, in the county of Tulare and State of California, have invented certain new and useful Improvements in Securing Means for Spare Tires, of which the following is a specification.

The present invention is an improved securing means for spare tires, and relates to means for securing one or more spare tires to an auxiliary tire carried on a rack or the like secured to an automobile.

The objects of the invention include;

(*a*) to provide a theft proof device of the character described which is inexpensive of manufacture, and which will be adjustable to different sizes of tires.

(*b*) to provide a securing means by which two or more tires may be bound together and locked and which affords means for further contraction to obviate vibration, rattling, and rubbing of the tires.

In the accompanying one sheet of drawings.

Figures 1, 2:
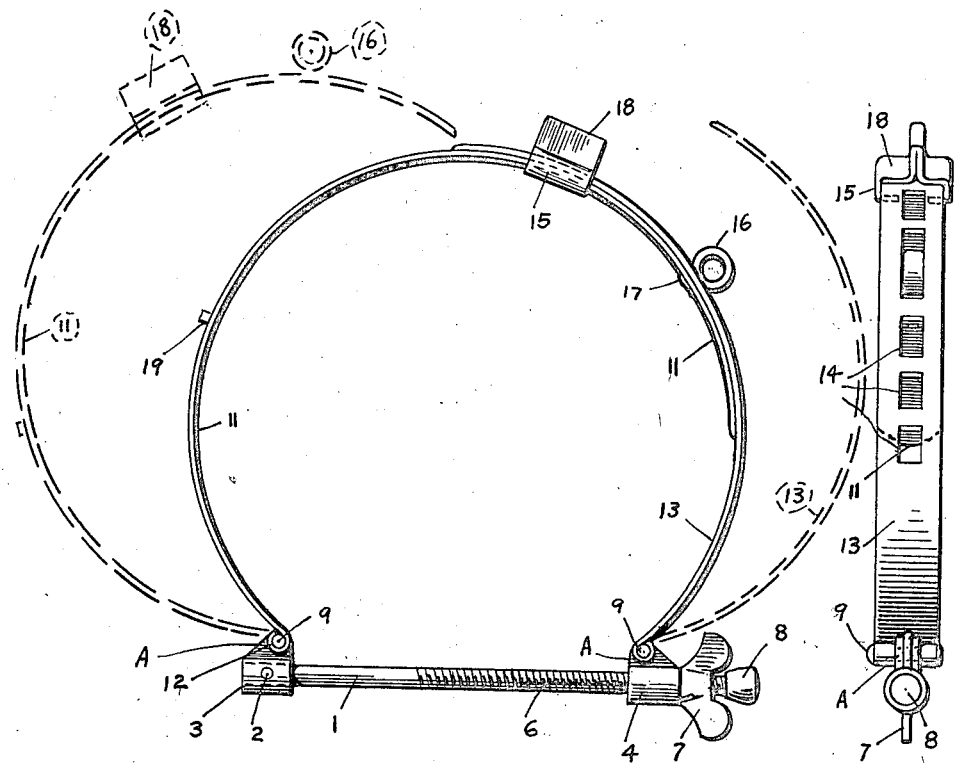
Figure 1 is a side elevation of my device.
Figure 2 is an edge view of Fig. 1.

Referring to the drawings, the numeral 1 indicates a rod, preferably of metal, to which is rigidly secured, as by a pin 2, a lug 3. A similar lug 4 is slidably disposed on the rod 1.

The rod 1 is threaded as indicated at 6 to engage an internally threaded wing nut 7 which serves, when rotated, to move the lug 4 toward the lug 3. The wing nut is prevented from removal from the rod 1 by a knob 8 fixed on said rod.

The lugs 3 and 4 are provided with upstanding members A through which extend transversely pintles 9. To the lug 3 is hingedly secured an arcuate band of spring steel 11, the bifurcated end of which straddles the lug A and the ends of said band are bent around to embrace the pintle 9 as shown at 12 to form a hinge connection which permits the member 11 to open as indicated by the dotted portion of Fig. 1.

Figure 3:
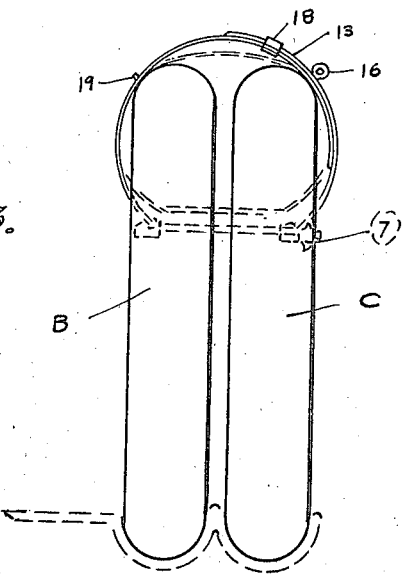
Figure 3 is an edge view of two tires held together at the top by my device.

Similarly hinged on the pintle 9 in the lug 4 is an arcuate band 13 of spring steel, adapted to open as shown in dotted lines to engage tires as shown in Fig. 3.

The member 13 is provided with a plurality of apertures 14, all of which are adapted to engage a ring member 16, secured to the member 11, as by riveting, as shown at 17, when the members 11 and 13 are in the overlapped position shown in Fig. 1.

By this means and because of the resiliency of the members 11 and 13, the device is capable of adjustment to accommodate various tire sizes. At 18 I show a clip provided with an upstanding flange for engagement by the finger and thumb for manipulation, and provided with channels 15 adapted to embrace the members 11 and 13 when same are overlapped.

The clip 18 is slidable on the member 11 and its range of movement thereon is limited by the ring 16 in one direction and by a stud 19 (secured to the member 11) in the opposite direction.

The operation of my device is as follows; when it is desired to secure two tires together as shown in Fig. 3, the members 11 and 13 are opened on their hinged joints to admit the tires as indicated at B and C. While the rod 1 engages the inner periphery of the tires (or rims supporting same) the members 11 and 13 are closed in overlapped relation to embrace the tires A and B, and the ring 16 engaged in one of the apertures 14. The clip 18 is then slid over the overlapping ends of 11 and 13, and if desired, a pad-lock snapped in the ring 16.

In order to prevent rattling or slippage of the tires (or wheels carrying them) the wing nut 7 is turned, drawing the lug 4 toward the lug 3. This oblates the device as indicated in dotted lines in Fig. 3 and holds the tires securely in place.

I claim—

1. A tire lock and anti-vibrator, comprising, in combination, two arcuate members of conformable curvature, said members hingedly connected at one end, said connection including two lugs on a bar, one fixed and one slidable thereon, and means for urging said slidable lug toward said fixed lug, and securing the same.

2. A tire lock and anti-vibrator, comprising, in combination, two arcuate members of conformable curvature, said members hingedly connected at one end and having their free ends adapted to overlap and embrace one or more tires, one of said ends having a series of slots therein, and the other end provided with a ring adapted to protrude through any one of said slots.

In testimony whereof I affix my signature.

JULIUS C. MANOCK.